Patented June 20, 1933

1,914,445

UNITED STATES PATENT OFFICE

FRITZ MAYER, OF FRANKFORT-ON-THE-MAIN, GERMANY, ASSIGNOR TO GENERAL ANILINE WORKS, INC., OF NEW YORK, N. Y., A CORPORATION OF DELAWARE

VAT DYESTUFFS OF THE DI-THIONAPHTHENYLENE-QUINONE SERIES AND A PROCESS OF PREPARING THEM

No Drawing. Application filed June 11, 1929, Serial No. 370,164, and in Germany June 29, 1928.

The present invention relates to vat dyestuffs of the di-thionaphthenylene-quinone series and to a process of preparing them.

I have found that valuable vat dyestuffs are obtainable by treating the derivatives of 2.2'-di-thionaphthenyl-ketone of the following formula:

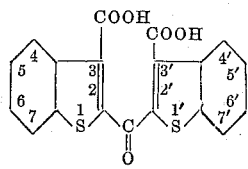

wherein the benzene nuclei may be substituted or not by any univalent residue, with agents capable of splitting off water and then heating the product thus obtained alone or with the addition of aluminium chloride, if necessary, in the presence of a melting agent.

Thus for instance there is obtained from 2 2'-di-thionaphthenyl-ketone-3.3'-dicarboxylic acid of the following formula:

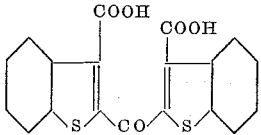

by splitting off successively 1 mol. of water and 1 mol. of carbon dioxide the di-thionaphthenylene-quinone of the formula:

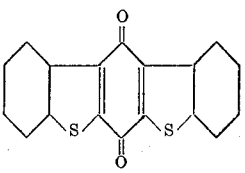

dyeing wool fast golden-yellow tints. During the course of the above reaction there is formed as intermediate product an anhydro-product which has probably one of the following formulae:

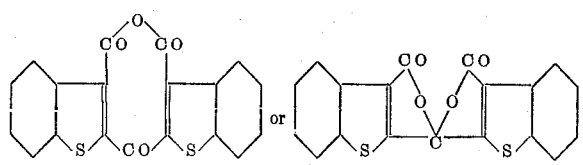

From such an anhydro-product the carbon dioxide may for instance be split off by merely heating the product to a higher temperature or by heating it with sodium-aluminium chloride.

The first step of the reaction, the splitting off of water, is preferably effected by heating the starting material alone or in the presence of acetic anhydride; other dehydrating agents may, however, likewise be used for this purpose.

By this reaction dyestuffs of the following general formula are obtained:

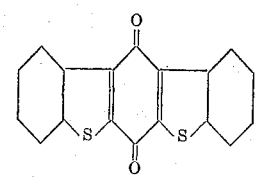

wherein the benzene nuclei may be substituted or not by any univalent residue. These dyestuffs are yellow to brown products which are soluble in concentrated sulfuric acid to a blue solution and dye wool from a yellow to orange alkaline hydrosulfite vat yellow to orange tints.

The same products are obtainable by using as starting material a di-thionaphthenyl-ketone-mono-carboxylic acid of the following general formula:

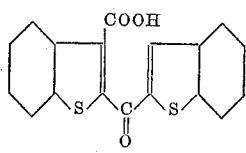

wherein the benzene nuclei may be substituted or not by any univalent residue. In this case the reaction is preferably conducted by first converting the mono-carboxylic acid into its chloride and then effecting the closure of the ring by means of aluminium chloride. One may also arrive at the same result without previously causing formation of the acid chloride.

The following examples serve to illustrate my invention but they are not intended to limit it thereto, the parts being by weight unless otherwise stated.

(1) 30 parts of 2.2'-di-thionaphthenyl-ketone-3.3'-dicarboxylic acid of the following formula:

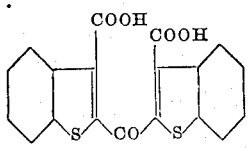

prepared for instance by condensing ortho-mercapto-benzoyl-formic acid with symmetrical dichloracetone whereby 2 mol. of hydrogen halide and 2 mol. of water are split off similar to the preparation of thionaphthene-2.3-dicarboxylic acid according to Friedländer (cf. Betzdrick & Königer, "Berichte der deutschen Chemischen Gesellschaft" volume 41, page 227 (1908)), are converted into the anhydro product which has probably one of the following formulæ:

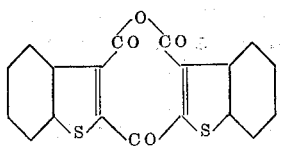

or

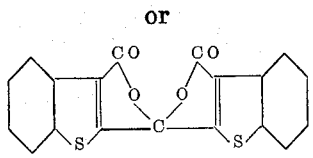

by heating the dicarboxylic acid on the reflux apparatus with 200 parts by volume of acetic anhydride. On cooling this anhydro-product crystallizes out from the acetic anhydride and melts at from 272° C. to 273° C. 40 parts of the anhydro-product of the above named dicarboxylic acid are heated in the bath up to 300° C. After cooling, the resulting di-thionaphthenylene-quinone of the following formula:

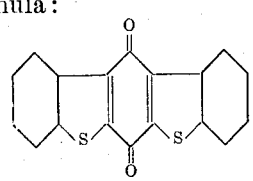

is revatted. It may be recrystallized from nitrobenzene and melts at 295° C. The product dissolves in sulfuric acid to a pure blue solution and dyes wool from a yellow vat golden-yellow tints.

(2) 12 parts of 2.2'-di-thionaphthenyl-ketone-3-carboxylic acid of the following formula:

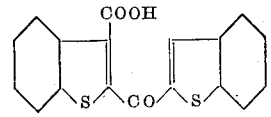

melting at between 268° C. and 269° C. and being prepared by condensing 1 mol. of ortho mercapto-benzaldehyde with 1 mol. of 2-ω-bromo-aceto-thionaphthene-3-carboxylic acid of the formula:

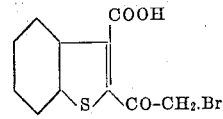

1 mol. of water and 1 mol. of hydrogen bromide being split off, are transformed into the acid chloride by means of thionylchloride. The acid chloride is dissolved in carbon disulfide, 15 parts of aluminium chloride are added to the solution and the mass is first allowed to stand and then heated on the water bath for some time. The mixture is then decomposed by the addition of water and hydrochloric acid, the carbon disulfide is blown off by means of steam and the residue is revatted. By this operation a dithionaphthenylene-quinone is obtained which is identical with that described in Example 1.

(3) 15 parts of 4.4'-dimethyl-6.6'-dichloro-2.2'-di-thionaphthenyl-ketone-3.3'-dicarboxylic acid of the following formula:

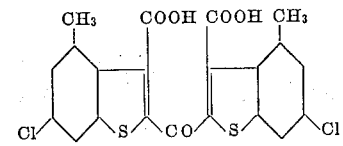

melting above 340° C. and being prepared by treating 2 mol. of 4-methyl-6-chloro-thionaphthene-quinone of the melting point of from 129° C. to 130° C. with 1 mol. of symmetrical dichloroacetone, 2 mol. of hydrogen chloride and 2 mol. of water being split off, are boiled for 30 minutes with 75 parts by volume of acetic anhydride. The acid is transformed into the anhydro-product without being previously dissolved. It also melts above 340° C. 10 parts of the so formed anhydro-product are gradually introduced at 175° C. into a melt of 40 parts of aluminium chloride and 10 parts of sodium chloride, the temperature being maintained at this stage until the formation of the dyestuff is complete. Thereupon the melt is decomposed with water and the residue is revatted. The resulting 4.4'-dimethyl-6.6'-dichloro-di-thionaphthenylene-quinone of the following formula:

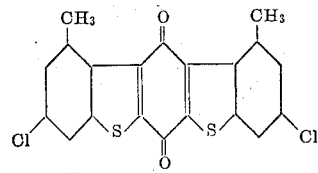

forms, when recrystallized from nitrobenzene, red needles of the melting point of 332° C. The dyestuff forms an orange vat and dissolves in concentrated sulfuric acid to a reddish-blue solution.

(4) 10.6 parts of 4-methyl-6-chloro-thionaphthene-quinone of the following formula:

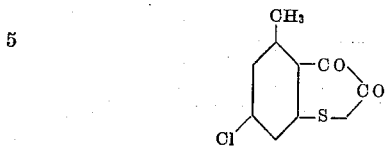

are dissolved in 100 parts by volume of a solution of sodium carbonate of 10 per cent strength, 5 parts of monochloracetone are added and the solution is boiled for 30 minutes. After cooling, the resulting sodium salt of 2-acetyl-4-methyl-6-chloro-thionaphthene-3-carboxylic acid is filtered by suction and decomposed by means of hydrochloric acid. The acid itself melts at between 179° and 180° C. and has the following formula:

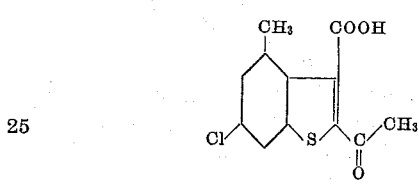

10 parts of this acid are dissolved in 50 parts by volume of glacial acetic acid and mixed with 7.4 parts of bromine. The mass is heated on the water bath and, after cooling, the resulting ω-bromo-derivative of the formula:

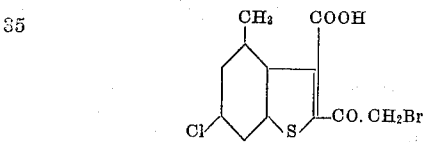

melting at between 217° C. and 218° C. is filtered by suction. 10 parts of the said acid are dissolved in 100 parts by volume of methanol and added to a solution of 4.7 parts of thionaphthene-quinone in 60 parts by volume of caustic soda solution of 10 per cent strength. The solution freed from the methanol is precipitated by means of hydrochloric acid and the resulting 4-methyl-6-chloro-di-thionaphthenylene-3.3'-dicarboxylic acid is recrystallized from introbenzene. It melts at 287° C. and has the following formula:

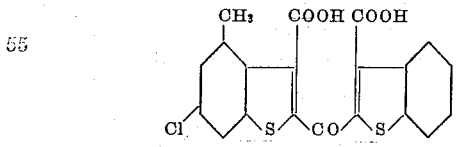

7 parts of this acid are boiled for 15 minutes with 35 parts of acetic anhydride. After cooling, the anhydro-product melting at between 314° C. and 315° C. is filtered by suction. 10 parts of the anhydro-product are gradually introduced at 140° C. into a melt prepared from 40 parts of aluminium chloride and 10 parts of sodium chloride. The dyestuff is formed while the mass is frothing. The melt is decomposed by means of water and the residue revatted. When recrystallized from nitrobenzene the dyestuff forms red needles of the melting point 288° C. to 289° C. It yields a yellow vat, dissolves in concentrated sulfuric acid to a reddish-blue solution and has the following formula:

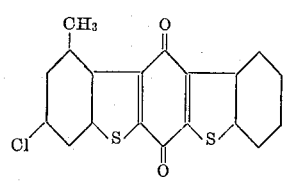

I claim:

1. The process which comprises treating a compound of the following formula:

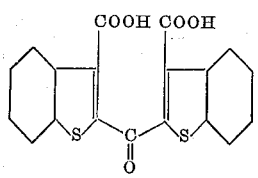

wherein the benzene nuclei may contain substituents selected from the group consisting of chlorine atoms and methyl groups with an organic carboxylic acid anhydride capable of splitting off water and then heating the intermediate product thus obtained.

2. The process which comprises treating a compound of the following formula:

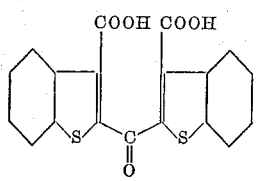

wherein the benzene nuclei may contain substituents selected from the group consisting of chlorine atoms and methyl groups with acetic anhydride and then heating the intermediate product thus obtained.

3. The process which comprises treating a compound of the following formula:

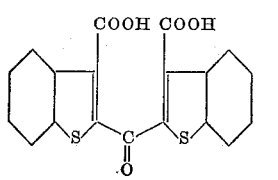

wherein the benzene nuclei may contain substituents selected from the group consisting of chlorine atoms and methyl groups with acetic anhydride and then heating the intermediate product thus obtained with aluminium chloride in the presence of a flux.

4. The process which comprises treating a compound of the following formula:

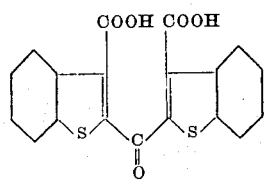

wherein the benzene nuclei may contain substituents selected from the group consisting of chlorine atoms and methyl groups with acetic anhydride and then heating the intermediate product thus obtained with sodium-aluminium chloride.

5. The process which comprises treating a compound of the following formula:

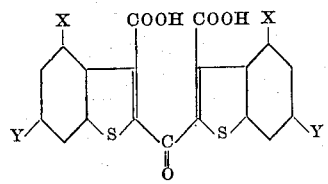

wherein X stands for hydrogen or methyl, Y for hydrogen or chlorine, with an organic carboxylic acid anhydride capable of splitting off water and then heating the intermediate product thus obtained.

6. The process which comprises treating a compound of the following formula:

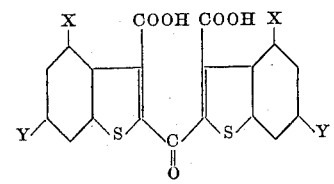

wherein X stands for hydrogen or methyl, Y for hydrogen or chlorine, with acetic anhydride and then heating the intermediate product thus obtained.

7. The process which comprises treating a compound of the following probable formula:

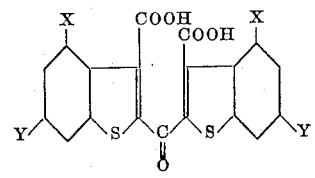

wherein X stands for hydrogen or methyl, Y for hydrogen or chlorine, with acetic anhydride and then heating the intermediate product thus obtained with sodium-aluminium chloride.

8. The process which comprises treating a compound of the following formula:

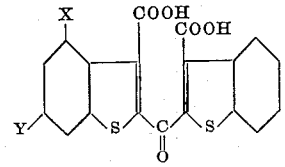

wherein X stands for hydrogen or methyl and Y for hydrogen or chlorine, with an organic carboxylic acid anhydride capable of splitting off water and then heating the intermediate product thus obtained.

9. The process which comprises treating a compound of the following formula:

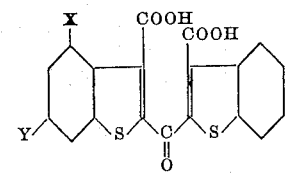

wherein X stands for hydrogen or methyl and Y for hydrogen or chlorine, with acetic anhydride and then heating the intermediate product thus obtained.

10. The process which comprises treating a compound of the following formula:

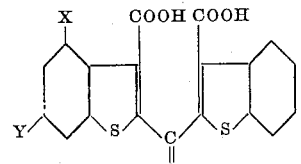

wherein X stands for hydrogen or methyl and Y for hydrogen or chlorine, with acetic anhydride and then heating the intermediate product thus obtained with sodium-aluminium chloride.

11. The process which comprises treating a compound of the following formula:

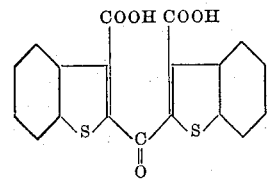

with an organic carboxylic acid anhydride capable of splitting off water and then heating the intermediate product thus obtained.

12. The process which comprises treating a compound of the following formula:

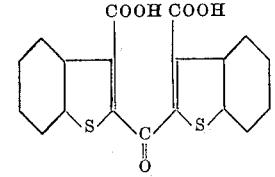

with acetic anhydride and then heating the intermediate product thus obtained.

13. The process which comprises treating a compound of the following formula:

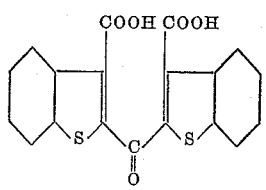

with acetic anhydride and then heating the intermediate product thus obtained with sodium-aluminium chloride.

14. As new products, compounds of the following formula:

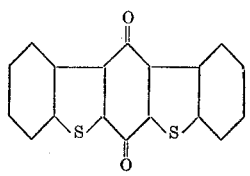

wherein the benzene nuclei may contain substituents selected from the group consisting of chlorine atoms and methyl groups being yellow to brown products which are soluble in concentrated sulfuric acid to a blue solution and dye wool from a yellow to orange alkaline hydrosulfite vat yellow to orange tints.

15. As new products, compounds of the following formula:

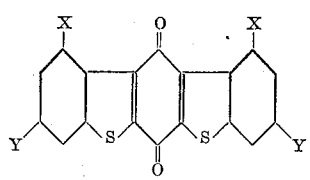

wherein X stands for hydrogen or methyl and Y for hydrogen or chlorine, being yellow to brown products which are soluble in concentrated sulfuric acid to a blue solution and dye wool from a yellow to orange alkaline hydrosulfite vat yellow to orange tints.

16. As new products, compounds of the following formula:

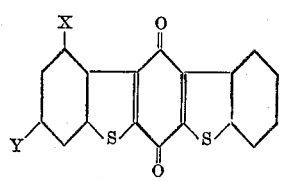

wherein X stands for hydrogen or methyl and Y for hydrogen or chlorine, being yellow to brown products which are soluble in concentrated sulfuric acid to a blue solution and dye wool from a yellow to orange alkaline hydrosulfite vat yellow to orange tints.

17. As a new product, di-thionaphthenylene-quinone of the following formula:

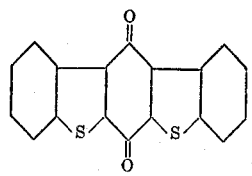

forming an orange powder, being insoluble in water, soluble in higher boiling organic solvents, in sulfuric acid to a blue solution melting at about 295° C. and yielding with alkaline hydrosulfite a yellow vat from which wool is dyed golden-yellow tints.

18. As a new product 4.4'-dimethyl-6.6'-dichloro-di-thionaphthenylene-quinone of the following formula:

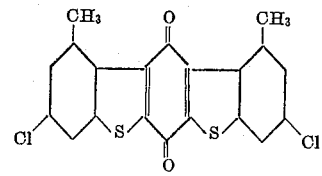

forming when recrystallized from nitrobenzene, red needles of the melting point of 332° C., dissolving in concentrated sulfuric acid to a reddish blue solution and yielding an orange vat.

19. As a new product 4-methyl-6-chloro-di-thionaphthenylene-quinone of the following formula:

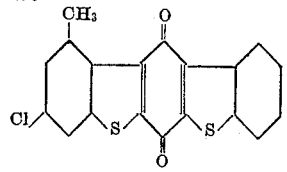

forming when recrystallized from nitrobenzene, red needles of the melting point of 288° to 289° C., dissolving in concentrated sulfuric acid to a reddish blue solution and yielding a yellow vat.

In testimony whereof I affix my signature.
FRITZ MAYER.